United States Patent [19]
Mori

[11] Patent Number: 4,501,084
[45] Date of Patent: Feb. 26, 1985

[54] FISHING NET

[76] Inventor: Kei Mori, No. 3-16-3-501, Kaminoge, Setagaya-ku, Tokyo, Japan

[21] Appl. No.: 520,337

[22] Filed: Aug. 4, 1983

[30] Foreign Application Priority Data

Aug. 11, 1982 [JP] Japan ................................ 57-139297

[51] Int. Cl.³ .............................................. A01K 75/02
[52] U.S. Cl. ........................................ 43/17.5; 43/6.5; 43/7; 43/102; 350/96.24
[58] Field of Search .................... 43/17.5, 4, 4.5, 7, 43/14, 102, 100

[56] References Cited

U.S. PATENT DOCUMENTS

| | | | |
|---|---|---|---|
| 1,088,222 | 2/1914 | Hall | 43/103 |
| 3,455,048 | 7/1969 | Knutsen | 43/6.5 |
| 3,749,901 | 7/1973 | Clough | 350/96.24 |

FOREIGN PATENT DOCUMENTS

| | | | |
|---|---|---|---|
| 251299 | 2/1970 | U.S.S.R. | 43/17.5 |
| 921483 | 4/1982 | U.S.S.R. | 43/17.5 |

*Primary Examiner*—Gene P. Crosby
*Attorney, Agent, or Firm*—Cantor and Lessler

[57] ABSTRACT

A fishing net includes a photoconductive cable comprising a plurality of optical fibers having light-emitting portions, wherein said light-emitting portions are divided into a first group adapted to emit light having favorable influence upon fish and a second group adapted to emit light having an adverse influence upon fish. The direction of light emanating from said first group of light-emitting portions is counter to that of light emanating from said second group of light-emitting portions. Fish travel into the net influenced by the light of the first group and are discouraged from leaving by the light of the second group.

4 Claims, 4 Drawing Figures

FISHING NET

BACKGROUND OF THE INVENTION

The present invention relates to a fishing net suitable for protecting, rearing and catching marine fish and shellfish (hereinafter called as the marine products).

Life in various form lives in the sea and provides an important nutritive source for mankind, but there is still a great deal to be desired with respect to their protection, rearing and capture.

In view of the fact, the present invention has been made to provide a fishing net to be used effectively for protecting, rearing and catching the marine products by making use of their responsive nature to light.

SUMMARY OF THE INVENTION

According to one aspect of the present invention, there is provided a fishing net including a photoconductive cable comprising a plurality of optical fibers having light-emitting portions, wherein said light-emitting portions are divided into a first group adapted to emit light having a favorable influence upon fish and a second group adapted to emit light having an adverse influence upon fish, and wherein the direction of light emanating from said first group of light-emitting portions is counter to that of light emanating from said second group of light-emitting portions.

The present invention will now be explained in detail with reference to the accompanying drawings, in which.

DESCRIPTION OF THE PREFERRED EMBODIMENT OF THE PRESENT INVENTION

Figure 1:
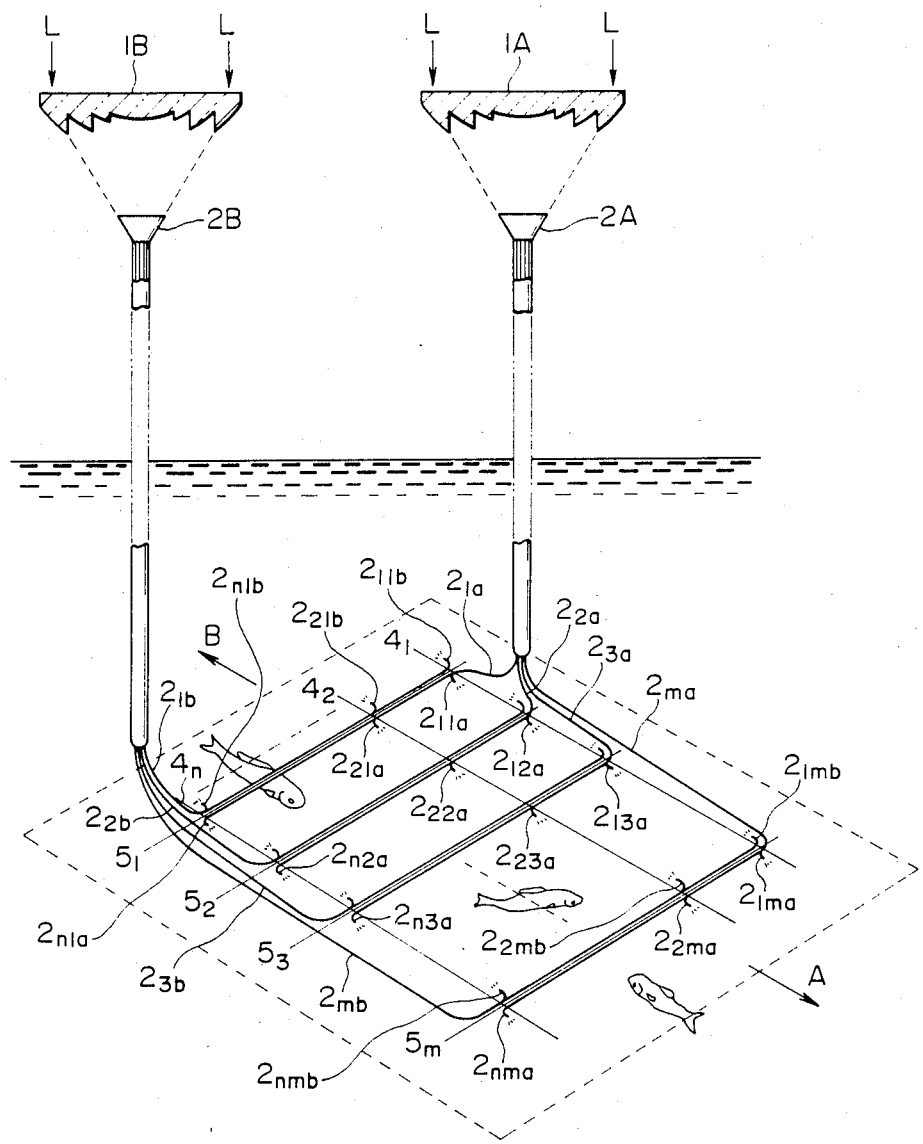
FIG. 1 is a schematic view illustrative of one embodiment of the fishing net according to the present invention.

Referring to FIG. 1, there is schematically shown one embodiment of the fishing net according to the present invention. Light L emanating from the sun or an artificial light source is focussed offshore or ashore by a lens 1A or 1B and introduced into a photoconductive cable 2A or 2B. The cable 2A or 2B comprises a plurality of optical fibers. The light introduced into the photoconductive cable is transmitted through the optical fibers, and sent out of their light-emitting portions $2_{11a}$–$2_{nma}$ to the sea. A fishing net 3 shown in FIG. 2, comprises a plurality of threads $4_1$–$4_n$ that run crosswise and a plurality of threads $5_1$–$5_m$ that run lengthwise, which are fixedly provided with the optical fibers of the cables 2A and 2B with their light-emitting portions $2_{11a}$–$2_{nma}$ and $2_{11b}$–$2_{nmb}$ being arranged at given intervals. For example, n pieces ×m pieces of optical fibers may be used with respect to the photoconductive cables 2A and 2B, and have their ends disposed on the points of intersection of the crosswise and lengthwise threads, or in the vicinity thereof, as light-emitting portions.

Alternatively, m pieces of optical fibers may be used with respect to the photoconductive cable. For instance, light-emitting portion $2_{11a}$–$2_{2n1a}$ or $2_{11b}$–$2_{n1b}$ are then formed by partial removal of a clad layer of an optical fiber $2_{1a}$ or $2_{1b}$ on points $2_{11a}$–$2_{n1a}$ or $2_{11b}$–$2_{n1b}$. Likewise, light-emitting portions can be obtained by partial removal of clad layers with respect to optical fibers $2_{2a}$–$2_{ma}$ or $2_{2b}$–$2_{mb}$. It is noted, however, that the light-emitting portions need not be arranged in a regular manner. No appreciable problem arises with respect to the number and spacing of the light-emitting portions, since, if they are arranged over the fishing net at suitable intervals, the light emanating therefrom is scattered in seawater.

When the thus arranged fishing net 3 is spread underseas and the light-emitting portions give off light, the light scatters extensively underseas. The response of fish to the light depends upon their nature. To the sunlight, for example, one group of fish responds and gathers around, another group of fish responds thereto but swim away, and the others show no response. However, generally fish tend to swim away upon exposure to blue and to be either indifferent to or attracted by red light. Indeed, many fish swim fast away upon exposure to argon laser of blue color and more fish swim away from light emanating from a xenon lamp containing much ultraviolet rays. However, there is a trend that fish gather around light of green color. Some fish show a response to helium laser of red color, but many are indifferent to it.

According to the present invention, the emitting direction of light transmitted through the photoconductive cable 2A is counter to that of light through the photoconductive cable 2B. Usually, both photoconductive cables are designed to give off light having a favorable influence upon the marine products and gather them around the fishing net 3 for protection and rearing. To catch the marine products, for instance, the photoconductive cable 2B feeds light having an adverse influence upon the marine products, thereby guiding them into a given location.

In other words, the light transmitted through the cable 2A is orientated in a direction indicated by an arrow A, while the light transmitted through the cable 2B is orientated in a direction indicated by an arrow B. thus, when light having favorable influence upon the marine products is fed out of the cable 2A and light having an adverse influence thereupon is fed out of the cable 2B, they move in the direction B and do not move back in the direction A. In this manner, the marine products gather around the side B, where they can efficiently be caught by a variety of suitable capture means. Most effectively, the marine products are guided into a capture net set on the side B.

Figure 2:
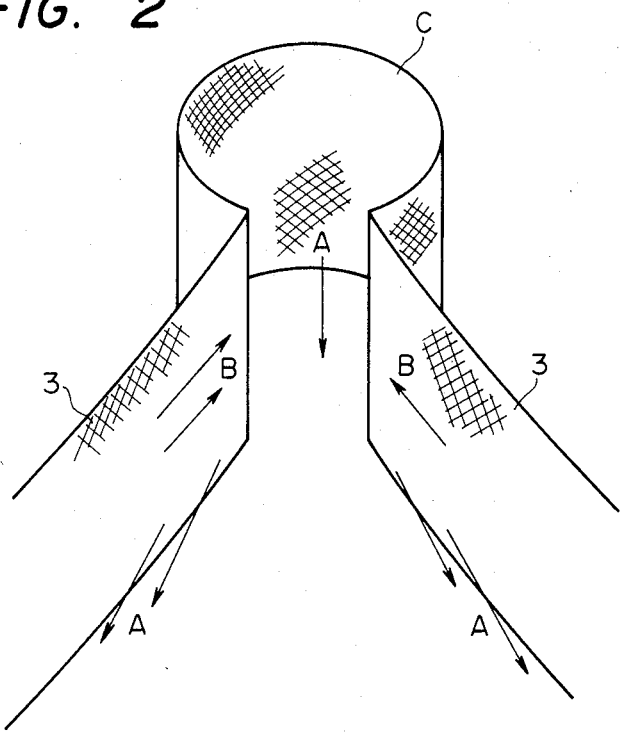
FIG. 2 is a view showing one arrangement of the fishing net applied for the capture of the marine product.
Figure 3:
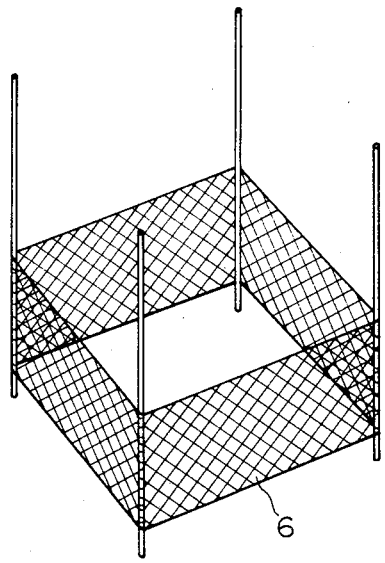
FIGS. 3 and 4 show embodiments of the capture net.

FIG. 2 schematically shows an arrangement of the fishing net applied to use the aforesaid capture net. As illustrated as an example, the fishing net 3 is spread in the emitting direction A of light having a favorable influence upon fish, and narrowed in the emitting direction B of light having an adverse influence. In this arrangement, the fish are guided by the net 3 and the light propagating in the direction A into a fishing location C. It is not likely that the fish, once brought in the fishing location C, may return in the direction A due to the light coming from the direction B. The fish collected in the fishing location C may be captured by any desired means. For instance, a capture net 6 may be disposed in the fishing location C, as shown in FIG. 3. This net 6 may be pulled up together with the fish remaining therein.

Figure 4:
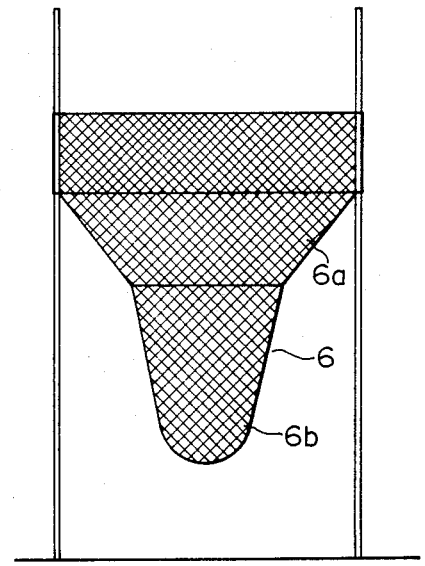

FIG. 4 shows another embodiment of the capture net 6, which comprises an upper large opening portion 6a and a lower bag portion 6b of which the opening has a reduced diameter, and is set at the sea bottom. In fish catching, when the upper portion 6a is pulled up, fish up around above the net 6 enter the upper portion 6a thereof. Further pulling up the net causes the fish to enter the lower portion 6a. After the net 6 is brought out of the sea, the fish caught in the net 6 can be taken out by separation of the lower bag 6b from the upper portion 6a. To the upper portion 6a can be connected a fresh bag 6b to form a capture net similar to the foregoing net 6.

As will be appreciated from the foregoing, the present invention effectively protects, rears and catches the marine products.

What is claimed is:

1. A fishing net including a photoconductive cable comprising a plurality of optical fibers having light-emitting portions, said light-emitting portions are divided into a first group adapted to emit light having a favorable influence upon fish and a second group adapted to emit light having an adverse influence upon fish, and the direction of light emanating from said first group of light-emitting portions is counter to that of light emanating from said second group of light-emitting portions, whereby fish are influenced in traveling into said net by said light of favorable influence and discouraged from leaving by said light having said adverse influence.

2. A fishing net as recited in claim 1, in which said fishing net includes a passage spreading in the direction of light emanating from said first group of light-emitting portions and narrowing in the direction of light emanating from said second group of light-emitting portions, through which passage fish are guided.

3. A fishing net as recited in claim 1, which further includes a capture net in front of the light emanating from said second group of light-emitting portions.

4. A fishing net as recited in claim 2, which further includes a capture net in front of the light emanating from said second group of light-emitting portions.

* * * * *